(12) United States Patent
Udagawa

(10) Patent No.: US 6,519,000 B1
(45) Date of Patent: *Feb. 11, 2003

(54) IMAGE PICKUP APPARATUS WITH MODE SWITCHING BETWEEN A STILL PICTURE MODE AND A MOVING PICTURE MODE

(75) Inventor: Yoshirou Udagawa, Saitama-ken (JP)

(73) Assignee: Canon Kabushiki Kaisha (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/668,752

(22) Filed: Jun. 24, 1996

(30) Foreign Application Priority Data

Jun. 30, 1995 (JP) .............................. 7-165931

(51) Int. Cl.⁷ .............................................. H04N 5/225
(52) U.S. Cl. ...................... 348/220.1; 348/322; 348/323
(58) Field of Search .................................. 348/322, 323, 348/324, 321, 320, 315, 318, 317, 316, 220, 312, 220.1; 257/242; 386/120

(56) References Cited

U.S. PATENT DOCUMENTS

| | | | |
|---|---|---|---|
| 4,546,390 A | * 10/1985 | Konishi et al. | 348/220 |
| 4,819,059 A | * 4/1989 | Pape | 348/220 |
| 4,963,980 A | * 10/1990 | Suga et al. | 348/317 |
| 5,051,832 A | * 9/1991 | Losee et al. | 348/220 |
| 5,239,380 A | * 8/1993 | Yokoyama | 348/220 |
| 5,264,944 A | * 11/1993 | Yakemura | 348/224 |
| 5,309,243 A | * 5/1994 | Tsai | 348/221 |
| 5,333,054 A | * 7/1994 | Tanaka et al. | 348/669 |
| 5,374,955 A | * 12/1994 | Furuhata et al. | 348/264 |
| 5,387,935 A | * 2/1995 | Kobayashi | 348/323 |
| 5,440,343 A | * 8/1995 | Parulski et al. | 348/316 |
| 5,483,283 A | * 1/1996 | Kannegundla | 348/312 |
| 5,523,787 A | * 6/1996 | Fukuba | 348/317 |
| 5,528,291 A | * 6/1996 | Oda | 348/220 |
| 5,559,552 A | * 9/1996 | Inuiya et al. | 348/220 |
| 5,712,680 A | * 1/1998 | Hieda | 348/220 |
| 5,734,424 A | * 3/1998 | Sasaki | 348/222 |
| 5,847,756 A | * 12/1998 | Iura et al. | 348/220 |

* cited by examiner

Primary Examiner—Aung S. Moe
(74) Attorney, Agent, or Firm—Fitzpatrick, Cella, Harper & Scinto

(57) ABSTRACT

An image pickup apparatus comprises: an interline-type image-sensing device, which includes: a plurality of photoelectric conversion elements, and a vertical transfer block for transferring charges received from the plurality of photoelectric conversion elements located along one direction. The vertical transfer block includes transfer electrodes disposed such that at least three transfer electrodes are disposed for each of the plurality of photoelectric conversion elements. At least one horizontal transfer block transfers charges received from the vertical transfer block along a direction crossing the one direction, and mode switching means switches a drive mode to drive the image-sensing device either in a still picture mode or in a moving picture mode. In the still picture mode, one frame data is outputted during one field period, the frame data being produced on the basis of the charges read from the photoelectric conversion elements in which the charges on two lines are transferred to the at least one horizontal transfer block during one horizontal blanking period without addition of charges read out from two of said plurality of photoelectric conversion elements located at adjacent positions along the one direction while, in the moving picture mode, a field data is outputted, the field data being produced on the basis of the charges read from the photoelectric conversion elements in which the charges read out from two of the plurality of photoelectric conversion elements located at adjacent positions along one direction are added together in the at least one horizontal transfer block.

11 Claims, 14 Drawing Sheets

FIG. 12

| Cy | Ye | Cy | Ye | Cy | Ye | Cy | ---------------- |
|----|----|----|----|----|----|----|------------------|
| Mg | G  | Mg | G  | Mg | G  | Mg | ---------------- |
| Cy | Ye | Cy | Ye | Cy | Ye | Cy | ---------------- |
| G  | Mg | G  | Mg | G  | Mg | G  | ---------------- |
| Cy | Ye | Cy | Ye | Cy | Ye | Cy | ---------------- |
| Mg | G  | Mg | G  | Mg | G  | Mg | ---------------- |
| Cy | Ye | Cy | Ye | Cy | Ye | Cy | ---------------- |
| G  | Mg | G  | Mg | G  | Mg | G  | ---------------- |
| Cy | Ye | Cy | Ye | Cy | Ye | Cy | ---------------- |
| Mg | G  | Mg | G  | Mg | G  | Mg | ---------------- |
| Cy | Ye | Cy | Ye | Cy | Ye | Cy | ---------------- |
| G  | Mg | G  | Mg | G  | Mg | G  | ---------------- |
|----|----|----|----|----|----|----|------------------|

IMAGE PICKUP APPARATUS WITH MODE SWITCHING BETWEEN A STILL PICTURE MODE AND A MOVING PICTURE MODE

BACKGROUND OF THE INVENTION

1. Field of the Invention

The present invention relates to an image pickup apparatus equipped with an image sensing device such as a CCD (charge coupled device) with an interline structure, having the capability of individually reading all pixels.

2. Description of the Related Art

A CCD image sensor of the interline type is widely used as an image sensing device in a video camera. This type of CCD is composed of: an array of photoelectric conversion elements (pixels) for generating an electric charge in response to incident light; vertical transfer blocks (VCCDs) for reading the charges accumulated in the respective pixels and transferring the charges in a vertical direction; and a horizontal transfer block (HCCD) for transferring in a horizontal direction the charges received from the vertical transfer blocks. FIG. 14 is a layout of pixels 101 and a vertical transfer block 102 disposed on a CCD chip of the interline type. As shown in FIG. 14, the vertical transfer block 102 includes a plurality of transfer gate electrodes 103 wherein two transfer gate electrodes 103 are disposed at a position corresponding to each pixel 101. One of the two transfer gate electrodes 103 is formed at a position more closely adjacent to the corresponding pixel 101. When a charge transfer pulse is applied to the transfer gate electrodes 103, a charge is transferred into the vertical transfer block 102 via the transfer gate electrode 103 closer to the pixel 101.

The conventional interline-type CCD is designed for use in a video camera for taking a moving picture. For that purpose, an image signal is output basically according to the field-reading scheme in which all pixels 101 are read during each field period and the charges read from two pixels located at adjacent positions along the vertical direction are added together before being output. The combination of pixels to be added together is varied in an interlaced fashion between even-numbered fields and odd-numbered fields. That is, in even-numbered fields, the upper two pixels of the four pixels 101 shown in FIG. 14 are added together and the lower two pixels are also added together wherein the addition is performed in the vertical transfer block 102. In odd-numbered fields, on the other hand, the two pixels in the middle of the four pixels 101 shown in FIG. 14 are added together. However, the vertical resolution of this type of CCD is one-half that of a CCD of the frame-reading type in which pixel charges are directly output without being added. Thus, the conventional interline-type CCD cannot provide a high resolution required to take a still picture.

To solve the above problem, an interline-type CCD having the capability of individually reading all pixels 101 each field period and producing one frame of image signal from non-added pixel values within one field period has been proposed. FIG. 13 is a layout of pixels 101 and a vertical transfer block 102 disposed on a CCD chip. In this CCD, as shown in FIG. 13, transfer gate electrodes 103 are disposed in a vertical transfer block 102 so that three transfer gate electrodes are located at a position corresponding to each pixel. This arrangement makes it possible to read full frame data during one field period without a reduction in the vertical resolution due to the addition of charges performed in the vertical transfer block 102.

However, if a CCD of the type shown in FIG. 13 is employed in an image pickup apparatus, although it becomes possible to separately read charges from all pixels 101 during one field period, the three-transfer-gate structure of the vertical transfer block 102 makes it impossible to add two pixels along the vertical direction which is possible in the case of the CCD shown in FIG. 14. This means that, in the image pickup apparatus with the CCD having the full frame reading capability, such as that shown in FIG. 13, it is impossible to directly obtain a field signal of a moving picture.

Therefore, in the image pickup apparatus of the above-described type, after reading a frame signal from the CCD, it is required to add pixel values along the vertical direction for all pixel values so that a field signal of a moving picture can be produced from the frame signal.

SUMMARY OF THE INVENTION

It is an object of the present invention to provide an image pickup apparatus equipped with an interline-type image-sensing device, having the capability of individually reading all pixels thereby directly obtaining a field signal of a moving picture.

According to an aspect of the present invention, there is provided an image pickup apparatus, equipped with an interline-type image-sensing device, the image-sensing device including: a plurality of photoelectric conversion elements; a vertical transfer block for transferring the charges received from the photoelectric conversion elements along one direction, the vertical transfer block including transfer electrodes disposed in such a manner that at least three transfer electrodes are disposed for each photoelectric conversion element; and a horizontal transfer block for transferring the charges received from the vertical transfer block along a direction crossing the above-described one direction; wherein the charges read from the photoelectric conversion elements on a plurality of lines located at adjacent positions along the above-described one direction of the image-sensing device are successively transferred through the vertical transfer block so that the charges read from the photoelectric conversion elements on the plurality of lines located at adjacent positions along the above-described one direction of the image-sensing device are added together in the horizontal transfer block thereby outputting the added pixel signal.

According to another aspect of the present invention, the image pickup apparatus further includes mode switching means for switching the driving mode of the image-sensing device, the mode switching means being adapted to switch the driving mode so that the image-sensing device is driven either in a still picture mode or in a moving picture mode, wherein in the still picture mode one frame data is output during one field period, the frame data being produced on the basis of the charges read from the photoelectric conversion elements in which no addition is performed between the charges read from two photoelectric conversion elements located at adjacent positions along the above-described one direction, while in the moving picture mode, field data is output, the field data being produced on the basis of the charges read from the photoelectric conversion elements in which the charges read from two photoelectric conversion elements located at adjacent positions along the above-described one direction are added together.

According to still another aspect of the invention, the above-described moving picture mode comprises at least either:

a normal moving picture mode in which the addition operation of adding the charges read from two photoelectric conversion elements located at adjacent positions along the above-described one direction is performed once during each horizontal blanking period thereby outputting one field data during one field period; or a high-speed moving picture mode in which the addition operation of adding the charges read from two photoelectric conversion elements located at adjacent positions along the above-described one direction is performed twice during each horizontal blanking period thereby outputting one field data during a half field period.

According to a further aspect of the invention, in the moving picture mode, the addition of the charge between two photoelectric conversion elements is performed in such a manner that the combination of two photoelectric conversion elements is interlaced between odd-numbered fields and even-numbered fields.

According to another aspect of the invention, the driving pulse for driving the horizontal transfer block has an amplitude corresponding to the number of photoelectric conversion elements whose charges are added together after being read.

According to a further aspect of the invention, there are provided a plurality of horizontal transfer blocks which are constructed so that charges may be transferred among these horizontal transfer blocks, and the driving pulse for driving said plurality of horizontal transfer blocks and the driving pulse for controlling the transfer operation among these horizontal transfer blocks have an amplitude corresponding to the number of photoelectric conversion elements whose charges are added together after being read.

According to still another aspect of the invention, of the plurality of horizontal transfer blocks, a horizontal transfer block located at a position furthest from the vertical transfer block has the capability of adding charges, wherein that horizontal transfer block at the furthest position has a transfer capacity greater than the other horizontal transfer blocks.

According to another aspect of the invention, the charges read from two photoelectric conversion elements located at adjacent positions along the above-described one direction are added together in the final stage of the vertical transfer block.

According to still another aspect of the invention, in the moving picture mode, one field data is produced by means of synthesis from two successive field data based on different amounts of exposure of light incident on the photoelectric conversion elements.

According to another aspect of the invention, in the synthesis process, when the exposure of the field data based on a greater amount of exposure than the other field data is within the range in which no saturation occurs, this field data is employed as the output field data while when the exposure of the field data based on a greater amount of exposure than the other field data is within the range in which saturation occurs, the field data based on a smaller amount of exposure is multiplied by a predetermined factor and the resulting multiplied data is employed as the output field data.

According to another aspect of the invention, the amount of exposure to the photoelectric conversion elements is controlled by controlling the exposure time by means of an electric shutter in which the charges accumulated in the photoelectric conversion elements are swept out toward a substrate.

According to a further aspect of the invention, in the moving picture mode, one output field data is produced by combining two successive field data which are shifted from each other.

The present invention having the aspects described above provides various advantages and features as will be described below. That is, the charges read from a plurality of photoelectric conversion elements located at adjacent positions along the above-described one direction are successively transferred through the vertical transfer block into the horizontal transfer block so that the charges are added together, and thus it is possible to obtain a field signal of a moving picture directly from the image-sensing device.

Furthermore, the image-sensing device can be driven in a desired mode selected from among three modes: a still picture more; a normal moving picture mode; and a high-speed moving picture mode. This allows the image pickup apparatus to be used in various manners according to the purpose of taking the picture.

Furthermore, the addition operation associated with the pixel charges is performed in an interlaced manner between odd-numbered fields and even-numbered fields and thus it is possible to obtain a high-quality moving picture.

Still furthermore, the amplitude of the driving pulse for driving the horizontal transfer block is increased in response to the number of photoelectric conversion elements whose charges are added together so that the horizontal transfer block has a large transfer capacity corresponding to the amount of charge to be transferred.

Furthermore, the driving pulse for driving the plurality of horizontal transfer blocks and the driving pulse for controlling the transfer operation among the plurality of horizontal transfer blocks have an amplitude corresponding to the number of photoelectric conversion elements whose charges are added together so that the transfer capacities within and among the horizontal transfer blocks are large enough to transfer the charges.

Furthermore, the addition of charges is performed in a horizontal transfer block located at a position furthest, of the plurality of horizontal transfer blocks, from the vertical transfer block. This allows a reduction in power consumption of the image-sensing device and also allows for simplification of the production process of the image-sensing device.

Still furthermore, the charges read from two photoelectric conversion elements located at adjacent positions along the above-described one direction are successively transferred so that the charges are added together in the final stage of the vertical transfer block. This makes it possible to obtain a field signal of a moving picture directly from the image-sensing device.

Furthermore, one field data is produced by means of synthesis from two successive field data based on different amounts of exposure of light incident on the photoelectric conversion elements so that the dynamic range is expanded.

Furthermore, the exposure time can be easily controlled by means of the electronic shutter.

Still furthermore, field data is produced by means of shifting pixel data so that a high-resolution image is obtained. Other objects, advantages, and features of the invention will become apparent from the following detailed description.

BRIEF DESCRIPTION OF THE DRAWINGS

FIG. 12 is a schematic diagram of a color pattern of a CCD filter used in color signal processing in the first to third embodiments of the invention;

DESCRIPTION OF THE PREFERRED EMBODIMENTS

The present invention will be described below in greater detail with reference to preferred embodiments in connection with the accompanying drawings.

Figure 1:
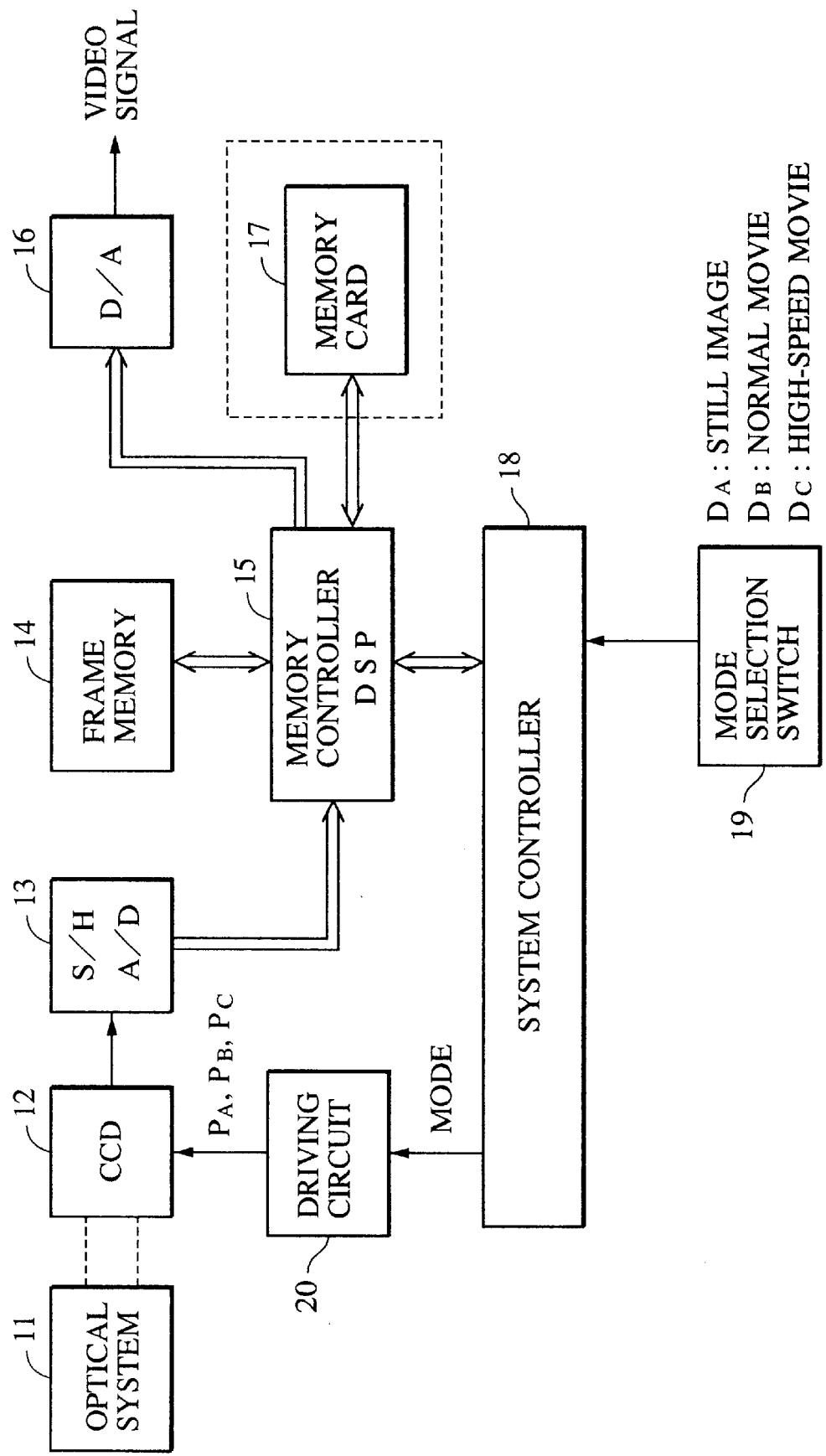
FIG. 1 is a block diagram generally illustrating the construction of an image pickup apparatus according to a first embodiment of the invention.

FIG. 1 is a block diagram of a first embodiment of an image pickup apparatus according to the present invention. In this specific embodiment, the image pickup apparatus is a digital camera capable of taking both a moving picture and a high-resolution still picture. An image of an object (not shown) is formed on the photo-sensing surface of a CCD 12 via an optical system 11 including a lens. The CCD 12 serves as an image sensing device for generating an electric signal in response to the optical signal corresponding to the object image formed on the photo-sensing surface. The output signal of the CCD 12 is supplied to a sample-and-hold (S/H) circuit/analog-to-digital (A/D) converter 13 and converted into digital form. The resultant digital data is supplied to a frame memory 14 via a memory controller 15 and stored in the frame memory 14. The signal supplied to the memory controller 15 from the CCD 12 is processed by a DSP (digital signal processor) in the memory controller 15 to perform gamma correction and color processing. The processed signal is then output as a video signal via a D/A converter 16 or written as digital data into a memory card 17.

There is provided a mode selection switch 19 for selecting a picture-taking operation mode from among three modes: a still picture mode ($D_A$); a normal movie mode ($D_B$); and a high-speed movie mode ($D_C$). A CCD driving circuit 20 supplies a driving signal to the CCD 12. The driving signal has a waveform $P_A$, $P_B$, or $P_C$ corresponding to a mode selection command (MODE) issued by a system controller 18. The mode selection command (MODE) is also supplied to the DSP from the system controller 18 so that the DSP performs a process corresponding to the selected picture-taking operation mode ($D_A$, $D_B$, $D_C$).

Figure 2:
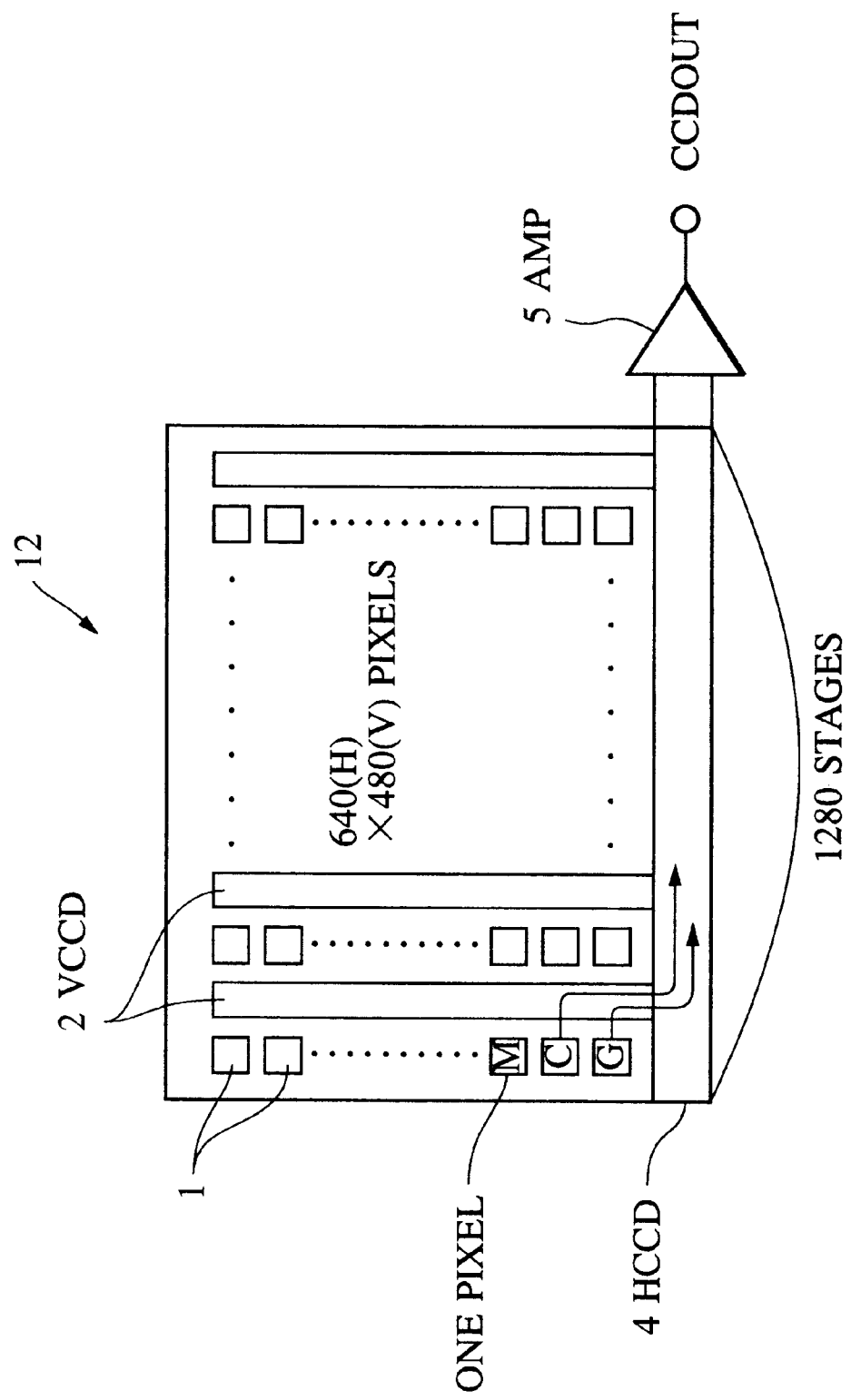
FIG. 2 is a schematic diagram illustrating in greater detail the CCD shown in FIG. 1.

The construction of the interline-type CCD 12 used in the digital camera according to the present invention will be described below. As shown in FIG. 2, the CCD 12 includes: an array (640 columns (H)×480 rows (V)) of photoelectric conversion elements (pixels) 1 such as photodiodes for generating electric charges corresponding to incident light; vertical transfer blocks (VCCDs) 2 for reading the charges accumulated in the respective pixels and transferring the charges in a vertical direction; a double-density horizontal transfer block (HCCD) 4 having 1280 stages of transfer gate electrodes, for transferring in a horizontal direction the charges received from the vertical transfer blocks; and an output amplifier 5 for converting the charges received from the horizontal transfer block 4 into a voltage signal and outputting the resultant voltage signal.

Figure 13:
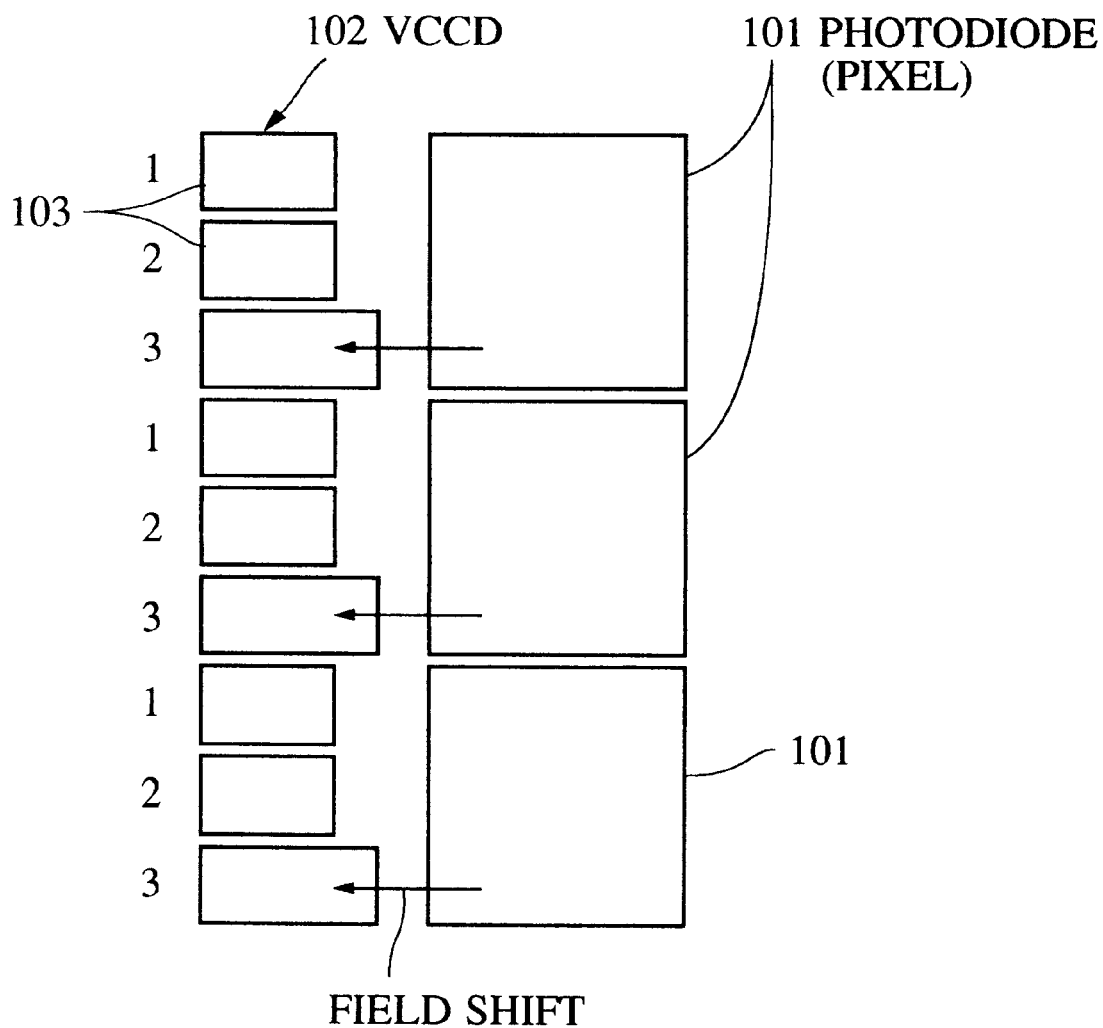
FIG. 13 is a partial schematic diagram illustrating some pixels and a vertical transfer block of an interline-type CCD having full frame reading capability.
Figure 14:
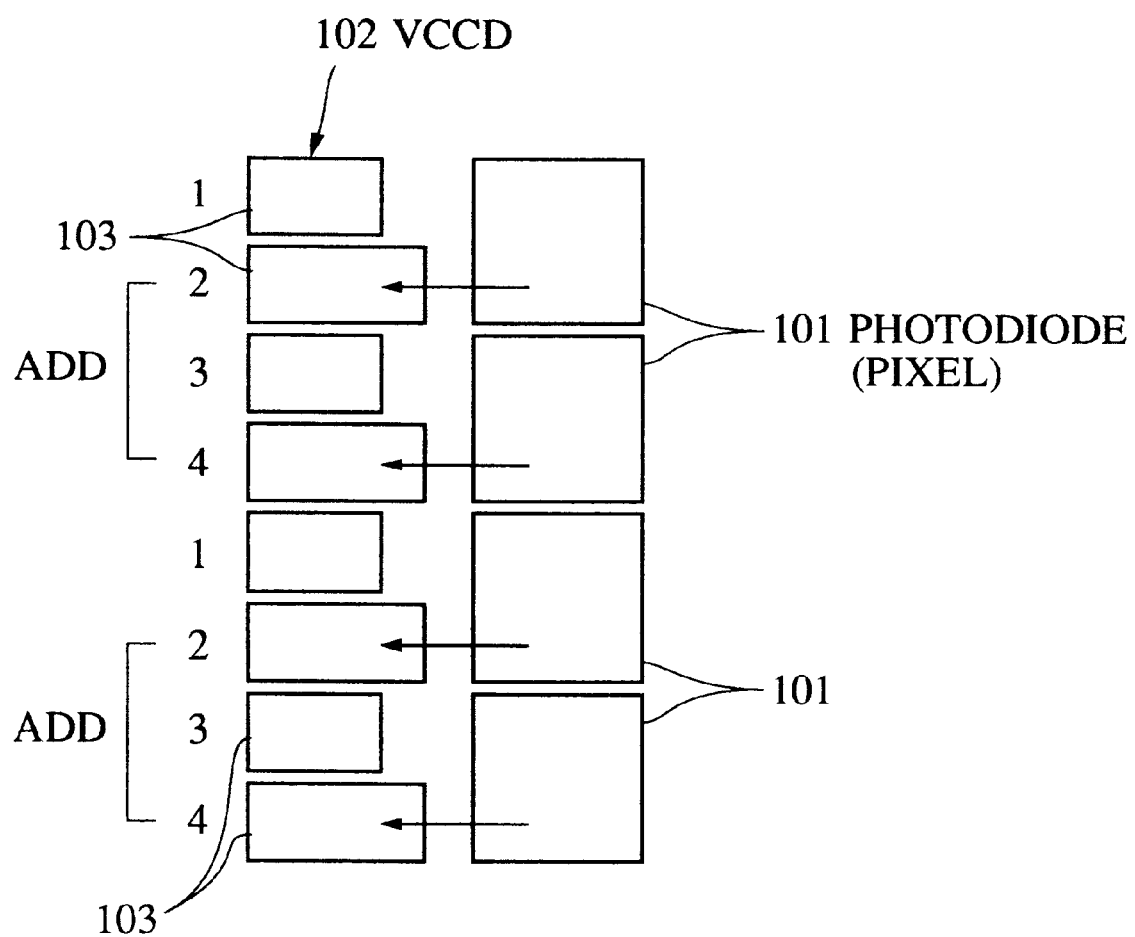
FIG. 14 is a partial schematic diagram illustrating some pixels and a vertical transfer block of an interline-type CCD having field reading capability.

In this CCD, the pixels 1 and the vertical transfer blocks 2 are disposed at relative locations in a manner similar to those shown in FIG. 13, in which transfer gate electrodes are disposed in the vertical transfer blocks 2 such that each pixel 1 has three transfer gate electrodes. When a charge transfer pulse is applied to the transfer gate electrodes, a charge is transferred from a pixel into the vertical transfer blocks 2 via a transfer gate electrode of three electrodes closest to the pixel 1. The charge is then transferred through the vertical transfer blocks 2 and further through the horizontal transfer block 4, and finally output via the output terminal CCDOUT of the output amplifier 5.

Figure 3:
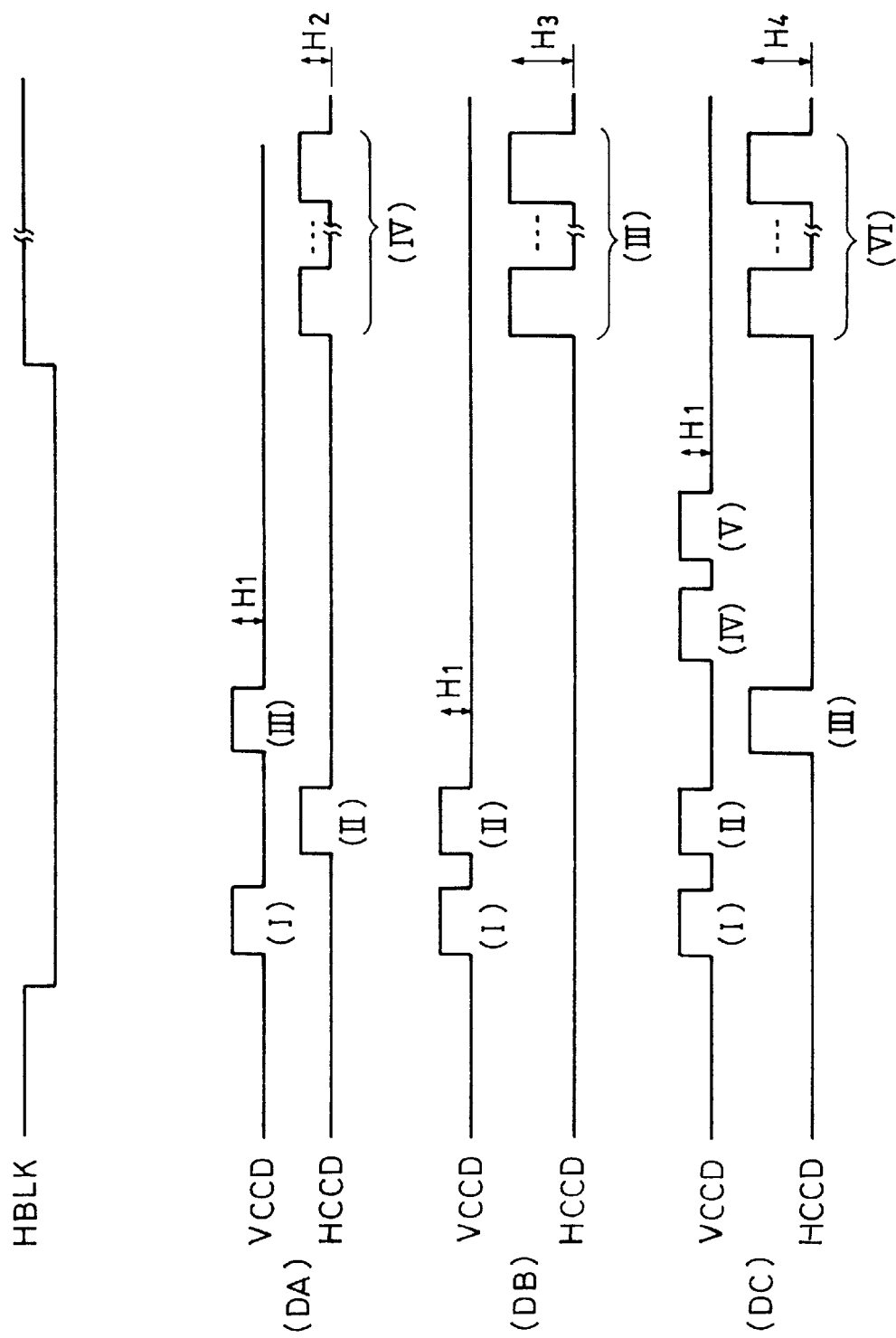
FIG. 3 is a schematic representation of the timing associated with the operation of driving the CCD shown in FIG. 1.

Referring to FIG. 3, the waveforms of pulses generated by the CCD driving circuit 20 to drive the CCD 12 in the digital camera of the present embodiment will be described below. A driving voltage is applied to the transfer gate electrodes of the vertical transfer blocks (VCCDs) 2 and the horizontal transfer block (HCCD) 4 during a horizontal blanking period (HBLK) and also during time periods prior to and subsequent to the horizontal blanking period so that charges are transferred through the vertical and horizontal transfer blocks. The timing and amplitude of the driving voltage are shown in FIG. 3 for each picture-taking operation mode ($D_A$, $D_B$, $D_C$). FIG. 3 is a simplified schematic illustration of the pulse waveform, which can vary depending on the pattern or other conditions.

First, the operation in the still image mode ($D_A$) will be described below. In the still picture mode, when operation enters a horizontal blanking period, a pulse (having an amplitude $H_1$) is applied to the transfer gate electrodes of the vertical transfer blocks 2 as to drive the vertical transfer blocks 2 such that the charges are transferred one stage thereby transferring the charges read from the pixels on the line closest to the horizontal transfer block 4 into the horizontal transfer block 4 (step I). After that, a voltage in the form of a pulse (hereafter referred to simply as a pulse) having an amplitude $H_2$ is applied to the transfer gate electrodes of the horizontal transfer block 4 so that the charges are transferred one stage along the horizontal direction and so that the horizontal transfer block 4 becomes ready to accept the subsequent charge from the vertical transfer block 2 (step II).

A pulse voltage (having an amplitude $H_1$) is then applied to the transfer gate electrodes of the vertical transfer blocks 2 so as to transfer the charges one stage in the vertical transfer blocks 2 so that the charges, read from one line next to the line whose charges have been transferred in the step (I), are transferred into the horizontal transfer block (step III). As a result of the above operation, charge signals supplied from pixels 1 on two lines of the pixel array are placed at alternate locations in the horizontal transfer block 4.

During an effective period following the horizontal blanking period, a great number of pulses (having an amplitude $H_2$) are applied to the transfer gate electrodes of the horizontal transfer block 4 so that the charges placed into the horizontal transfer block 4 in the above steps (I) to (III) are transferred along the 1280 stages (step IV) thereby outputting via the output amplifier 5 the 1280 pixel data associated with the two lines (640 pixels×2 lines) of the pixel array. The above operation is performed repeatedly 240 times (once every horizontal blanking period) during one field period (1/60 sec) thereby reading the charges accumulated in the pixels 1 over the entire array consisting of 640×2×240= 307200 pixels. As a result of the above operation, data of a frame image based on the non-added pixel value is obtained.

In the above operation, the amplitude $H_1$ of the pulse applied to the transfer gate electrodes of the vertical transfer blocks 2 is equal to the amplitude $H_2$ of the pulse applied to the transfer gate electrodes of the horizontal transfer block 4 ($H_1=H_2$).

Now, the operation in the normal movie mode ($D_B$) will be described. In the normal movie mode, when operation enters a horizontal blanking period, a pulse (having an amplitude $H_1$) is applied to the transfer gate electrodes of the vertical transfer blocks 2 as to drive the vertical transfer blocks 2 such that one stage of transfer occurs so that the charges read from the pixels on the line closest to the horizontal transfer block 4 are transferred into the horizontal transfer block 4 (step I). While maintaining the horizontal transfer block 4 in the above state, another pulse (having an amplitude $H_1$) is applied to the transfer gate electrodes of the vertical transfer blocks 2 as to drive the vertical transfer blocks 2 such that further one stage of transfer occurs whereby the charges read from the pixels on the line immediately adjacent to the line whose charges have been transferred in the above step (I) are transferred into the horizontal transfer block 4 (step II). As a result of the above operation, the charges read from the pixels on the two adjacent lines are added together in the horizontal transfer block 4.

During an effective period following the horizontal blanking period, a plurality of pulses (having an amplitude $H_3$) are applied to the transfer gate electrodes of the horizontal transfer block 4 so that the charges, which have been placed into the horizontal transfer block 4 and added therein in the above steps (I) to (II), are transferred along the 1280 stages (step III) thereby outputting via the output amplifier 5 the data associated with 1280 pixels on the two lines (640 pixels×2 lines) of the pixel array. In this case, there are 640 data values since each pair of pixel charges are added together and thus data are present at every two stages.

The above operation is performed repeatedly 240 times (once every horizontal blanking period) during one field period (1/60 sec) thereby reading the charges accumulated in the pixels 1 over the entire array consisting of 640×2×240= 307200 pixels. As a result of the above operation, data of a frame image based on the two-pixel-addition values is obtained.

In the above operation, the amplitude $H_3$ of the pulse applied to the transfer gate electrodes of the horizontal transfer block 4 is about twice the amplitude $H_1$ of the pulse applied to the transfer gate electrodes of the vertical transfer blocks 2 ($2H_1=H_3$). This allows the horizontal transfer block 4 to have a transfer capacity twice that of the vertical transfer blocks 2 thereby ensuring that the charges which have become about twice as great as a result of the addition operation can be transferred within the horizontal transfer block 4 without saturation occurring.

The operation in the high-speed movie mode ($D_C$) will be described below. In the high-speed movie mode, when operation enters a horizontal blanking period, a pulse (having an amplitude $H_1$) is applied to the transfer gate electrodes of the vertical transfer blocks 2 as to drive the vertical transfer blocks 2 such that one stage of transfer occurs thereby transferring the charges read from the pixels on the line closest to the horizontal transfer block 4 into the horizontal transfer block 4 (step I). While maintaining the horizontal transfer block 4 in the above state, another pulse (having an amplitude $H_1$) is applied to the transfer gate electrodes of the vertical transfer blocks 2 as to drive the vertical transfer blocks 2 such that further one stage of transfer occurs whereby the charges read from the pixels on the line immediately adjacent to the line whose charges have been transferred in the above step (I) are transferred into the horizontal transfer block 4 (step II). As a result of the above operation, the charges read from the pixels on the two adjacent lines are added together in the horizontal transfer block 4.

After that, a pulse (having an amplitude $H_4$) is applied to the transfer gate electrodes of the horizontal transfer block 4 so that the charges are transferred one stage along the horizontal direction and so that the horizontal transfer block 4 becomes ready to accept the subsequent charges from the vertical transfer blocks 2 (step III).

Furthermore, another pulse (having an amplitude $H_1$) is applied to the vertical transfer blocks 2 so that charges are transferred one stage. After that, while maintaining the horizontal transfer block 4 in the above state, a pulse (having an amplitude $H_1$) is applied to the vertical transfer block so that charges are transferred further one stage whereby the charges read from the pixels on the two adjacent lines next to the two lines whose charges have been transferred into the horizontal transfer block 4 in the steps (I) and (II) are added together in the horizontal transfer block 4. As a result of the above operation, signal charges originating from the pixels 1 on four lines of the pixel array are now present in the horizontal transfer block 4 in such a manner that each of the added charges, originating from each pair of lines, are alternately placed.

During an effective period following the horizontal blanking period, a plurality of pulses (having an amplitude $H_4$) are applied to the transfer gate electrodes of the horizontal transfer block 4 so that the charges are transferred along the 1280 stages of the horizontal transfer block 4 (step VI) thereby outputting, via the output amplifier 5, the 1280 data based on the 2560 pixels on the four lines (640 pixels×4 lines).

The above operation is performed repeatedly 120 times (once every horizontal blanking period) during a first half of a field period (1/60 sec) thereby reading the charges accumulated in the pixels 1 over the entire array consisting of 640×4×120=307200 pixels. As a result of the above operation, field image data based on the two-pixel-addition values is obtained.

In the above operation, the amplitude $H_4$ of the pulse applied to the transfer gate electrodes of the horizontal transfer block 4 is about twice the amplitude $H_1$ of the pulse applied to the transfer gate electrodes of the vertical transfer blocks 2 ($2H_1=H_4$). This allows the horizontal transfer block 4 to have a transfer capacity twice that of the vertical transfer blocks 2 thereby ensuring that the charges which have become about twice as great as a result of the addition operation can be transferred within the horizontal transfer block 4 without saturation.

The pixel signal obtained in the above-described manner is processed by subsequent processing circuits such as the memory controller 15. The processed signal is then output as a video signal via the D/A converter 16 or written as digital data into the memory card 17. In the image pickup apparatus of the present embodiment, as described above, it is possible to obtain field data directly from the CCD 12 serving as an image sensing device. This makes it very easy to perform the processes at the subsequent stages.

A second embodiment of a video camera according to the present invention will be described below. In this second embodiment, a CCD with a composite dual HCCD structure having the capability of individually reading all pixels is employed to achieve a wide dynamic range in producing image data.

Figure 4:
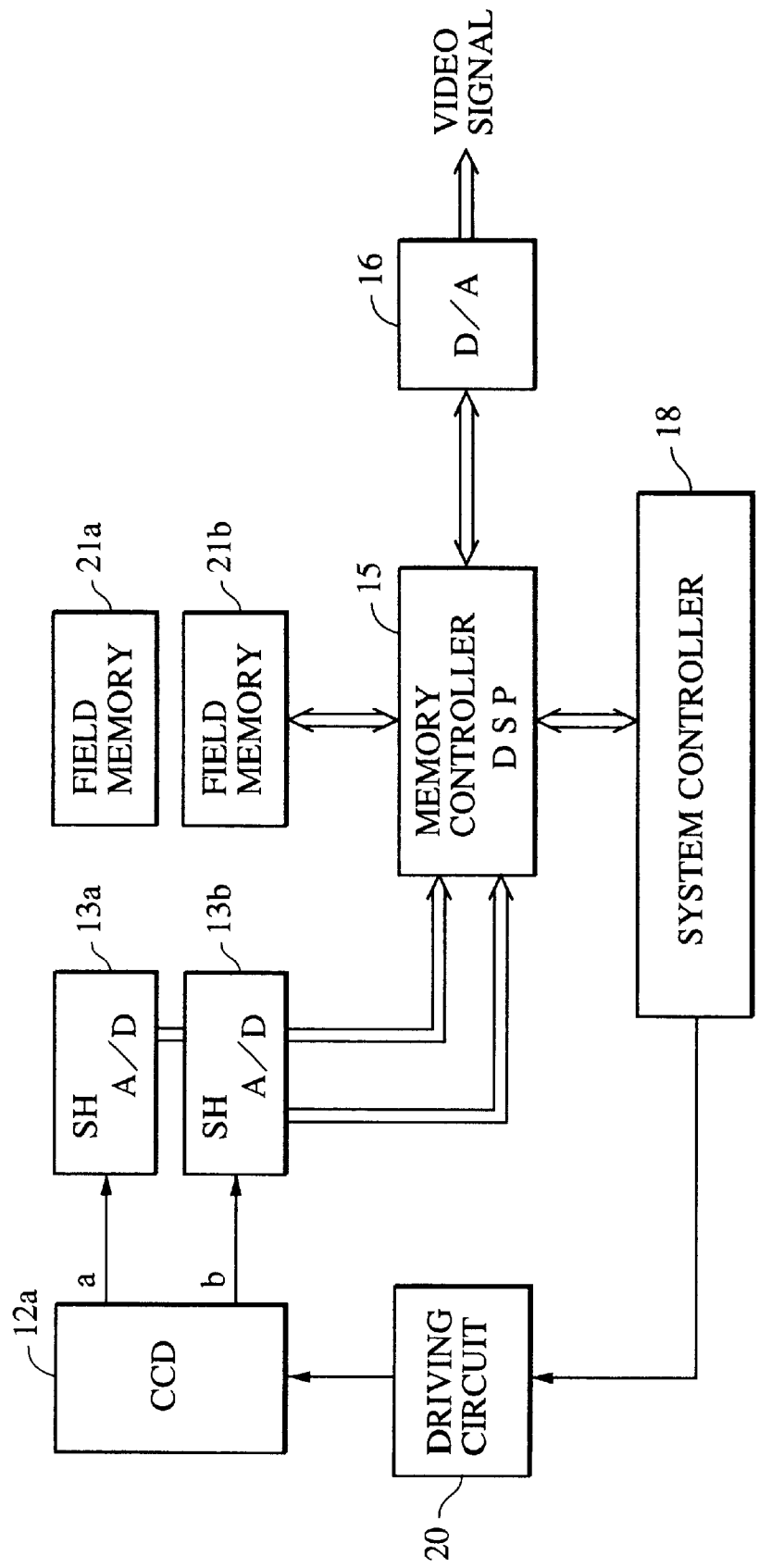
FIG. 4 is a block diagram generally illustrating the construction of an image pickup apparatus according to a second embodiment of the invention.

FIG. 4 is a block diagram generally illustrating the construction of the video camera of the present embodiment. In FIG. 4, the CCD 12a having the composite dual HCCD structure generates electric charges in response to the image of an object formed via an optical system (not shown) wherein the electric signals corresponding to the generated charges are output via terminals a and b. The output signals a and b are supplied to sample-and-hold (SH) circuit/analog-to-digital (A/D) converter 13a and 13b, respectively. The signals are processed by the memory controller including a DSP 15 to produce standard image data with an exposure time of 1/120 sec, and the resultant signal is stored in a field memory 21a. Then 2EV-under-exposure image data is produced by controlling the electric shutter so that the exposure time becomes 1/500 sec, and the resultant image data is stored in the field memory 21b. From these two sets of image data, the DSP in the memory controller 15 synthesizes a 1/60 sec field image having a wide dynamic range according to the procedure which will be described later. The resultant image data is output as a video signal via the D/A converter 16.

Figure 5:
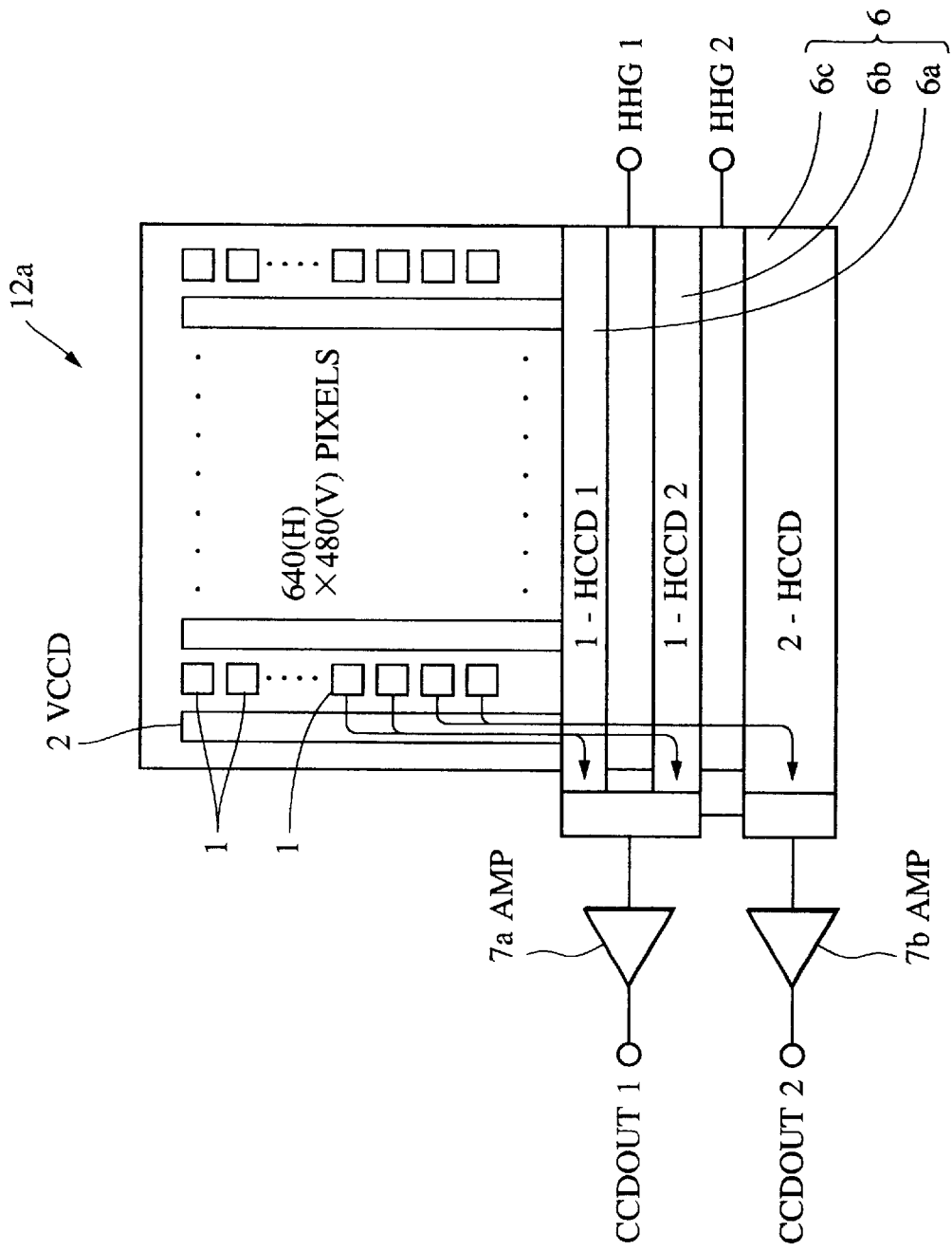
FIG. 5 is a schematic diagram illustrating in greater detail the CCD shown in FIG. 4.

FIG. 5 is a schematic diagram illustrating the structure of the CCD 12a with the composite dual HCCD structure employed in the present embodiment. As shown in FIG. 5, the CCD 12a includes: an array (640 columns (H)×480 rows (V)) of photoelectric conversion elements (pixels) 1 such as photodiodes; vertical transfer blocks (VCCDs) 2 for reading the charges accumulated in the respective pixels and transferring the charges in a vertical direction; three horizontal transfer blocks (HCCDs) 6a, 6b, and 6c having 1280 stages of transfer gate electrodes, for transferring the charges received from the vertical transfer blocks in a horizontal direction; and output amplifiers (AMPs) 7a and 7b for converting the charges received from the horizontal transfer blocks 6a, 6b, and 6c into a voltage signal and outputting the resultant voltage signal. In this CCD, the pixels 1 and the vertical transfer blocks 2 are disposed at relative locations in a similar manner to those shown in FIG. 13.

In the CCD shown in FIG. 5, the horizontal transfer block 6 includes three parts: a first horizontal transfer block (1-HCCD 1) 6a, a second horizontal transfer block (1-HCCD 2) 6b, and a third horizontal transfer block (2-HCCD) 6c. In the CCD 12a with the composite dual HCCD structure, after the charges are read from the pixels 1 into the vertical transfer blocks 2, the obtained charges are distributed into the first, second, and third horizontal transfer blocks 6a, 6b, and 6c via two gate electrodes (HHG 1, HHG 2), and then transferred through these three horizontal transfer blocks to the output amplifiers 7a and 7b. Thus, the corresponding output signals (CCDOUT 1, CCDOUT 2) are output by the output amplifiers 7a and 7b.

In this embodiment, as described above, since the horizontal transfer block 6 is composed of the composite dual HCCD structure, it is possible to drive the horizontal transfer block at a lower frequency compared to the double-density HCCD structure employed in the first embodiment described earlier. This allows for a reduction in power consumption. Furthermore, this structure is easy to fabricate when compared with the double-density horizontal transfer block which requires difficult micro fabrication process techniques. In the case where the horizontal transfer block has a simple dual structure, it is required that the horizontal transfer block closer to the vertical transfer block be narrower than the other horizontal transfer block so as to achieve adequate charge transfer efficiency in the transfer from the horizontal transfer block closer to the vertical transfer block to the other horizontal transfer block. However, such a structure results in a reduction in the transfer capacity of the horizontal transfer block closer to the vertical transfer block. In this embodiment, to avoid the above problem, the horizontal transfer block closer to the vertical transfer block 2 exhibits a dual structure including two narrow vertical transfer blocks so that the total capacity of the two blocks becomes equal to the transfer capacity of one wide horizontal transfer block. In this way, the structure is functionally equivalent to the double-density HCCD structure. Thus, the structure has the capability of individually reading all pixels in a 1/60 sec period without performing an addition operation.

Figure 6:
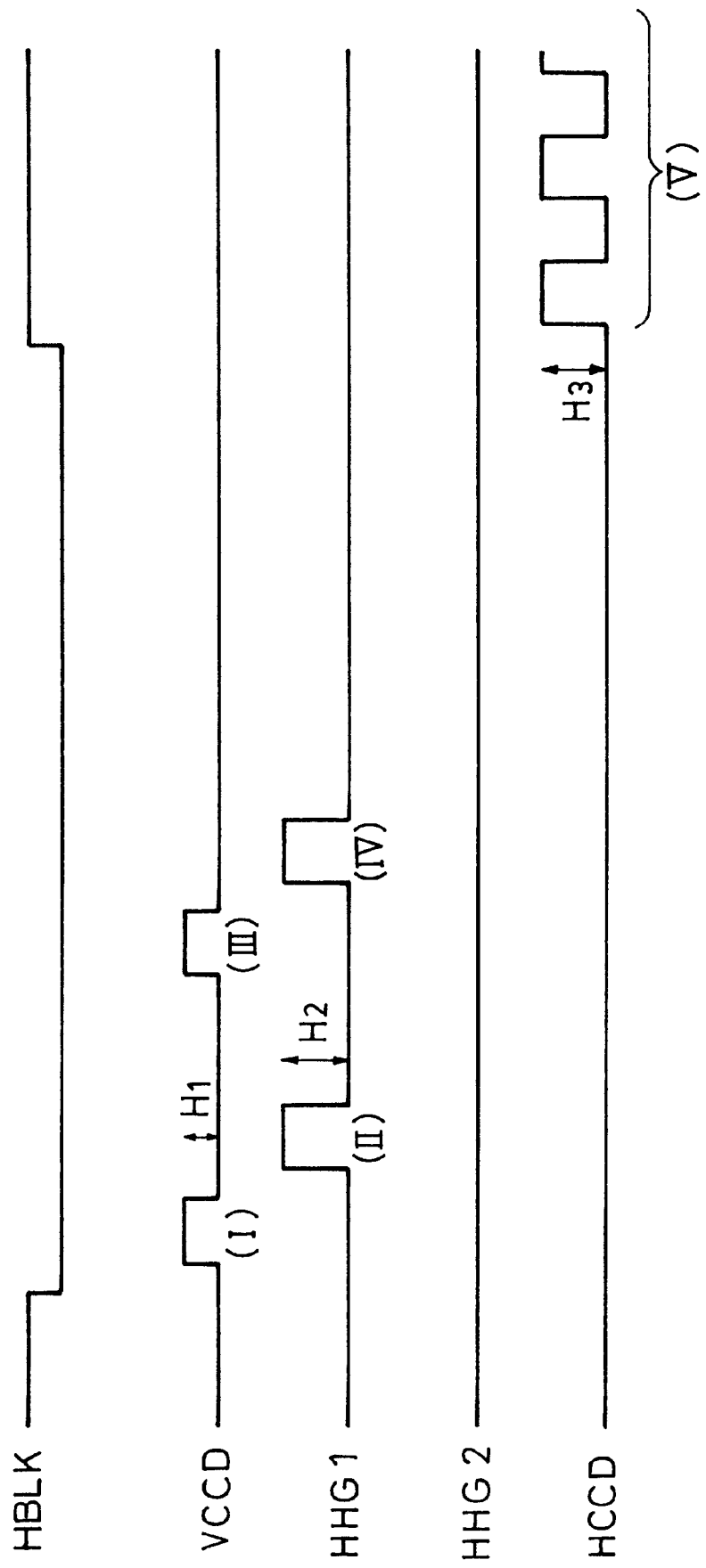
FIG. 6 is a schematic representation of the timing associated with the operation, in a normal movie mode, of driving the CCD shown in FIG. 4.

Referring to FIG. 6, the waveforms of pulses generated by the CCD driving circuit 20 to drive the CCD 12a in the normal movie mode in the digital camera of the present embodiment will be described below. FIG. 6 schematically represents the timing and amplitude of a driving voltage which is applied in the normal movie mode to the transfer gate electrodes of the vertical transfer blocks (VCCDs) 2 and the horizontal transfer blocks (HCCD) 6, and also to the gate electrodes (HHG 1, HHG 2) disposed between the horizontal transfer blocks 6a, 6b, and 6c during a horizontal blanking period (HBLK) and also during time periods prior to and subsequent to the horizontal blanking period so that charges are transferred through the vertical and horizontal transfer blocks.

In FIG. 6, when operation enters a horizontal blanking period, a pulse (having an amplitude $H_1$) is applied to the transfer gate electrodes of the vertical transfer blocks 2 so as to drive the vertical transfer blocks 2 once (step I). Another pulse (having an amplitude $H_2=2H_1$) is then applied to the gate electrode (HHG 1) so that charges are distributed into the first and second horizontal transfer blocks 6a and 6b (step II). After that, the vertical transfer blocks 2 are driven once again so that a further one stage of transfer occurs (step III). The gate electrode (HHG 1) is then driven so that the charges are distributed into the first and second horizontal transfer blocks 6a and 6b (step IV). As a result of the above operation, the charges read from the pixels on the two lines of the pixel array are added together in the first and second horizontal transfer blocks 6a and 6b, respectively.

After the horizontal blanking period, a plurality of pulses (having an amplitude $H_3=H_2=2H_1$) are applied to the transfer gate electrodes of the first and second horizontal transfer blocks 6a and 6b so that the charges are transferred through the horizontal transfer blocks 6a and 6b along their 1280 stages (step V) thereby outputting, via the output amplifier 7a, the 640 data based on the added pixel values associated with the 1280 pixels on the two lines (640 pixels×2 lines).

The above operation is performed repeatedly 240 times (once every horizontal blanking period) during one field period (1/60 sec) thereby reading the charges accumulated in the pixels 1 over the entire array consisting of 640×2×240= 307200 pixels. Thus, field image data based on the two-pixel-addition values is obtained and stored in the field memory 21a. As in the previous embodiment, a large transfer capacity required to transfer the added charges is achieved by setting the amplitudes of the driving pulses such that $H_3=H_2=2H_1$.

Figure 7:
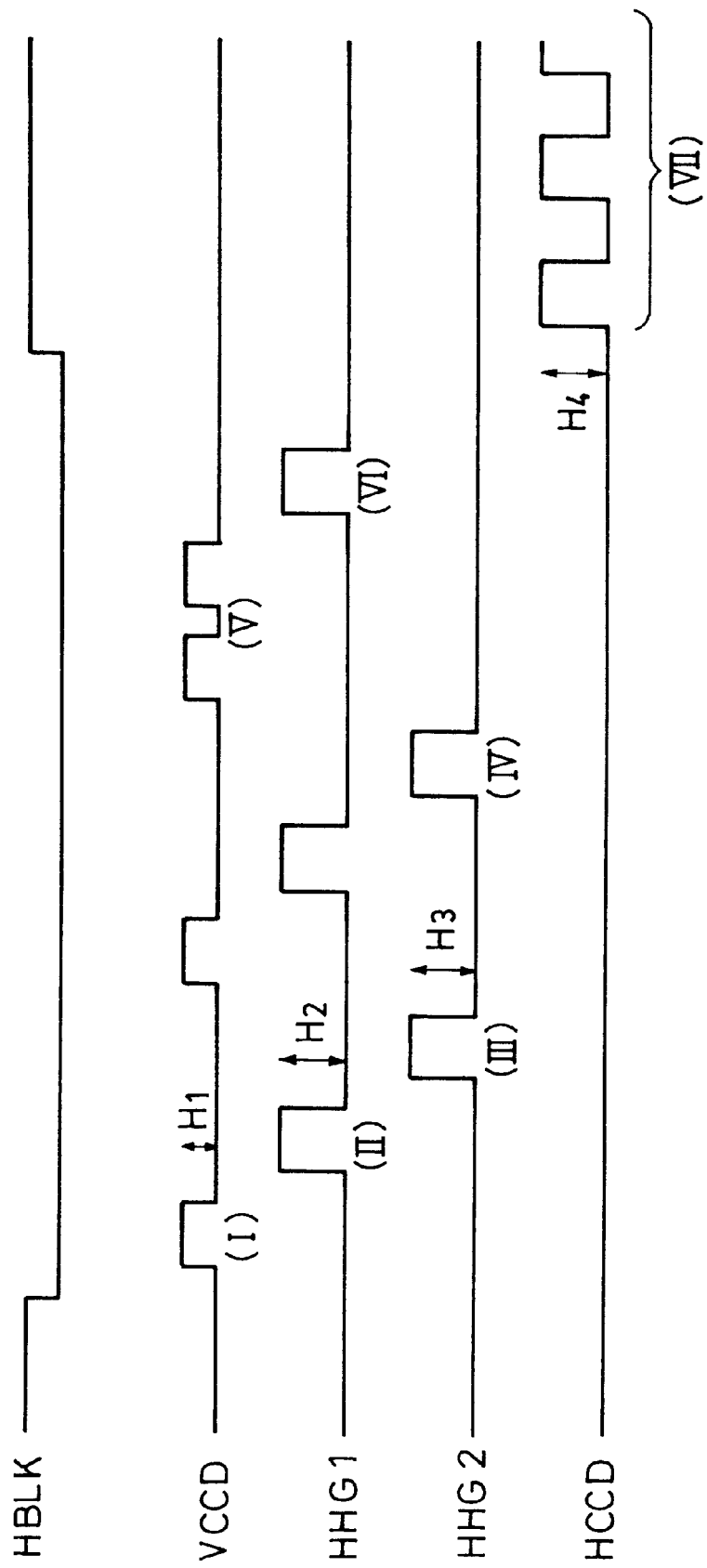
FIG. 7 is a schematic representation of the timing associated with the operation, in a high-speed movie mode, of driving the CCD shown in FIG. 4.

Referring to FIG. 7, the waveforms of pulses generated by the CCD driving circuit 20 to drive the CCD 12a in the high-speed movie mode in the digital camera of the present embodiment will be described below. FIG. 7 schematically represents the timing and amplitude of a driving voltage used in the high-speed movie mode.

In FIG. 7, when operation enters a horizontal blanking period, a pulse (having an amplitude $H_1$) is applied to the transfer gate electrodes of the vertical transfer blocks 2 so as to drive the vertical transfer blocks 2 once (step I). Another pulse (having an amplitude $H_2=2H_1$) is then applied to the gate electrode (HHG 1) so that charges are transferred into channels under this gate electrode (HHG 1) (step II). After that, the gate electrode (HHG 2) is driven by a pulse (having an amplitude $H_3=2H_1$) so that charges are transferred into the third transfer block (2-HCCD) 6c (step III). The above operation is performed once again so that the charges read from the pixels on two lines of the pixel array are added together in the third horizontal transfer block (2-HCCD) 6c (step IV).

The vertical transfer blocks 2 are then driven twice so that the charges of the pixels on the two lines immediately adjacent to the two lines whose charges have been transferred to the third horizontal transfer block (2-HCCD) 6c in the steps (I) to (IV) described above are transferred into the channels under the gate electrode (HHG 1) (step V). After that, the gate electrode (HHG 1) is driven so that the charges are distributed into the first horizontal transfer block (1-HCCD 1) 6a and the second horizontal transfer block (1-HCCD 2) 6b. After completion of the horizontal blanking period, the horizontal transfer blocks 6a, 6b, and 6c (HCCD) are driven by a driving pulse (having an amplitude $H_4=2H_1$) so that the data associated with the first two lines is output via the output amplifier 7b and the data associated with the second two lines is output via the output amplifier 7a.

The above operation is performed repeatedly 120 times (once every horizontal blanking period) during the first (or second) half (1/120 sec) of one field period (1/60 sec). Thus, the operation of reading the charges from the 640×4×120= 307200 pixels is completed and data of a frame image based on the two-pixel-addition values is obtained. The resultant data is stored in the field memory 21a.

After that, another field data having two-level lower exposure (−2EV) is read during a 1/120 sec period by rasing the electric potential of the silicon substrate on which the pixels 1 are formed thereby sweeping out unnecessary charges accumulated in the pixels 1 toward the silicon substrate and thus performing a 1/500-sec electronic shutter operation. The resultant data is stored in the field memory 21b.

Figure 8:
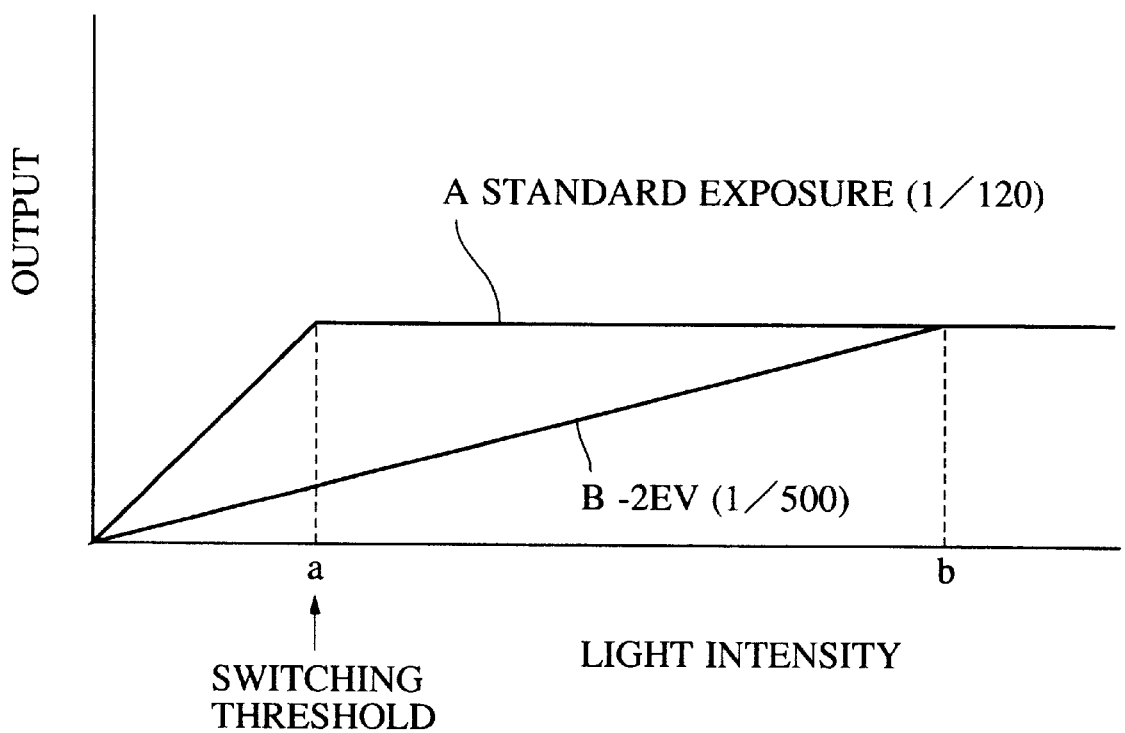
FIG. 8 is a graph illustrating the magnitude of the output signal as a function of the intensity of the light incident on the CCD shown in FIG. 4.

With reference to FIG. 8, the operation of generating image data from two data which are generated under different exposure conditions and which are then stored in the field memories 21a and 21b, respectively, will be described below. FIG. 8 is a graph illustrating the magnitude of the output signal of the pixel 1 as a function of the intensity of the incident light for two different exposure conditions: standard exposure condition (exposure time of 1/120 sec) denoted by A; and exposure condition of −2EV (exposure time of 1/500 sec) denoted by B. As can be seen from FIG. 8, if the incident light is within a low intensity range, the data obtained under the standard exposure condition A is employed. On the other hand, the data obtained by multiplying the image data under the exposure condition B (−2EV) by a factor of 4 is employed when the intensity of the incident light is equal to or greater than a switching threshold a at which the data under the standard exposure condition A reaches saturation, then the saturation light intensity is expanded to a level denoted by b (that is, the dynamic range is expanded). The image data having a wide dynamic range generated in the above-described manner is then converted into a final output form via gamma and nu curves.

Now, a third embodiment of the invention will be described below.

In this embodiment, instead of adding charges in the horizontal transfer block 6, the addition is performed in a CCD (VS) provided at the final stage of the vertical transfer blocks 2. After the addition operation in the CCD (VS), the added charges are transferred to the horizontal transfer block 6.

Figure 9:
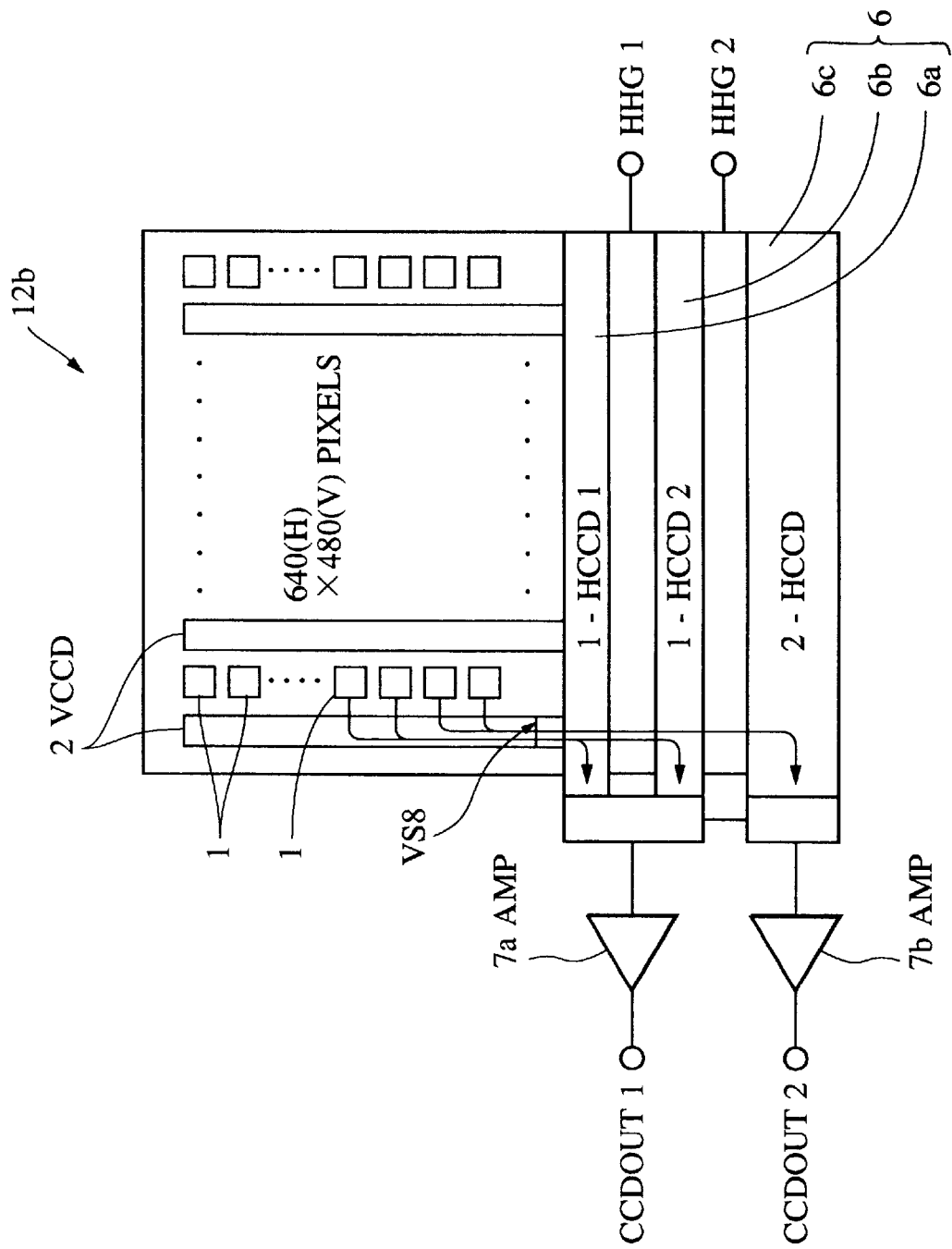
FIG. 9 is a schematic diagram illustrating a CCD used in an image pickup apparatus according to a third embodiment of the invention.

FIG. 9 is a schematic diagram illustrating the structure of a CCD 12b employed in the present embodiment. In FIG. 9, charges are transferred from the photo-sensing surface including 640 (H)×480 (V) pixels to three horizontal transfer blocks 6a, 6b, and 6c. The final stage of the vertical transfer blocks 2 is a special transfer stage VS (VCCD storing) 8 for performing addition of charges. After being added at the stage VS 8, the charges are transferred to the horizontal transfer block 6. The other portions are constructed in the same manner as in the structure of the second embodiment described above with reference to FIG. 5. Furthermore, the general construction of a camera is similar to that of the second embodiment described above with reference to FIG. 4.

Figure 10:
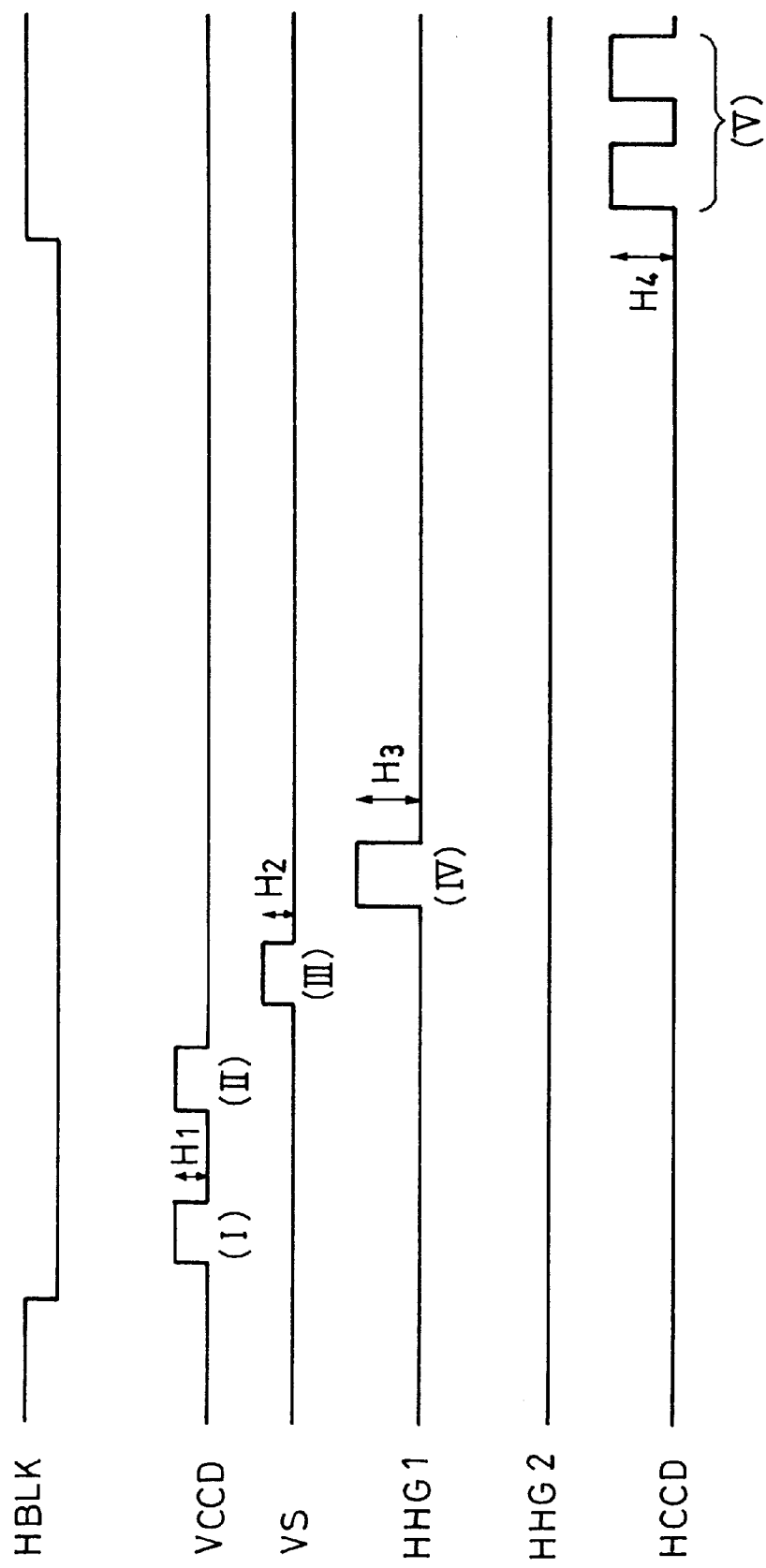
FIG. 10 is a schematic representation of the timing associated with the operation, in a normal movie mode, of driving the CCD shown in FIG. 9.

Referring to FIG. 10, the waveforms of pulses generated by the CCD driving circuit 20 to drive the CCD 12b in the normal movie mode in the digital camera of the present embodiment will be described below. FIG. 10 schematically represents the timing and amplitude of a driving voltage which is applied, in the normal movie mode, to the transfer gate electrodes of the vertical transfer blocks (VCCDs) 2, the VS 8, and the horizontal transfer block (HCCD) 6, and also to the gate electrodes (HHG 1, HHG 2) disposed between the horizontal transfer blocks 6a, 6b, and 6c during a horizontal blanking period (HBLK) and also during time periods prior to and subsequent to the horizontal blanking period so that charges are transferred through the vertical and horizontal transfer blocks.

In FIG. 10, when operation enters a horizontal blanking period, the vertical transfer blocks 2 are driven once by a pulse (having an amplitude $H_1$) (step I). Subsequently, the vertical transfer blocks 2 are driven once again by a pulse (having an amplitude $H_1$) so that charges associated with two lines are added together (step II). The VS 8 is then driven once by a pulse (having an amplitude $H_2=H_1$) so that the charges are transferred to the first horizontal transfer block 6a (step III). Then the gate electrode (HHG 1) is driven by a pulse (having an amplitude $H_3=2H_1$) so that the charges are distributed into the first and second horizontal transfer blocks 6a and 6b (step IV).

After completion of the horizontal blanking period, a plurality of pulses (having an amplitude $H_4=H_3=2H_1$) are applied to the first and second horizontal transfer blocks 6a and 6b (HCCD) so that the charges are transferred through the horizontal transfer blocks 6a and 6b along their 1280 stages (step V) thereby outputting, via the output amplifier 7a, the 640 data based on the two-pixel-addition values originated from the 1280 pixels on the two lines (640 pixels×2 lines).

The above operation is performed repeatedly 240 times (once every horizontal blanking period) during one field period (1/60 sec). Thus, the operation of reading the charges from the 640×2×240=307200 pixels is completed and frame image data based on the two-pixel-addition values is obtained. The resultant data is stored in the field memory 21a. As in the previous embodiments, a large transfer capacity required to transfer the added charges is achieved by setting the amplitudes of the driving pulses such that $H_3=H_2=2H_1$.

Figure 11:
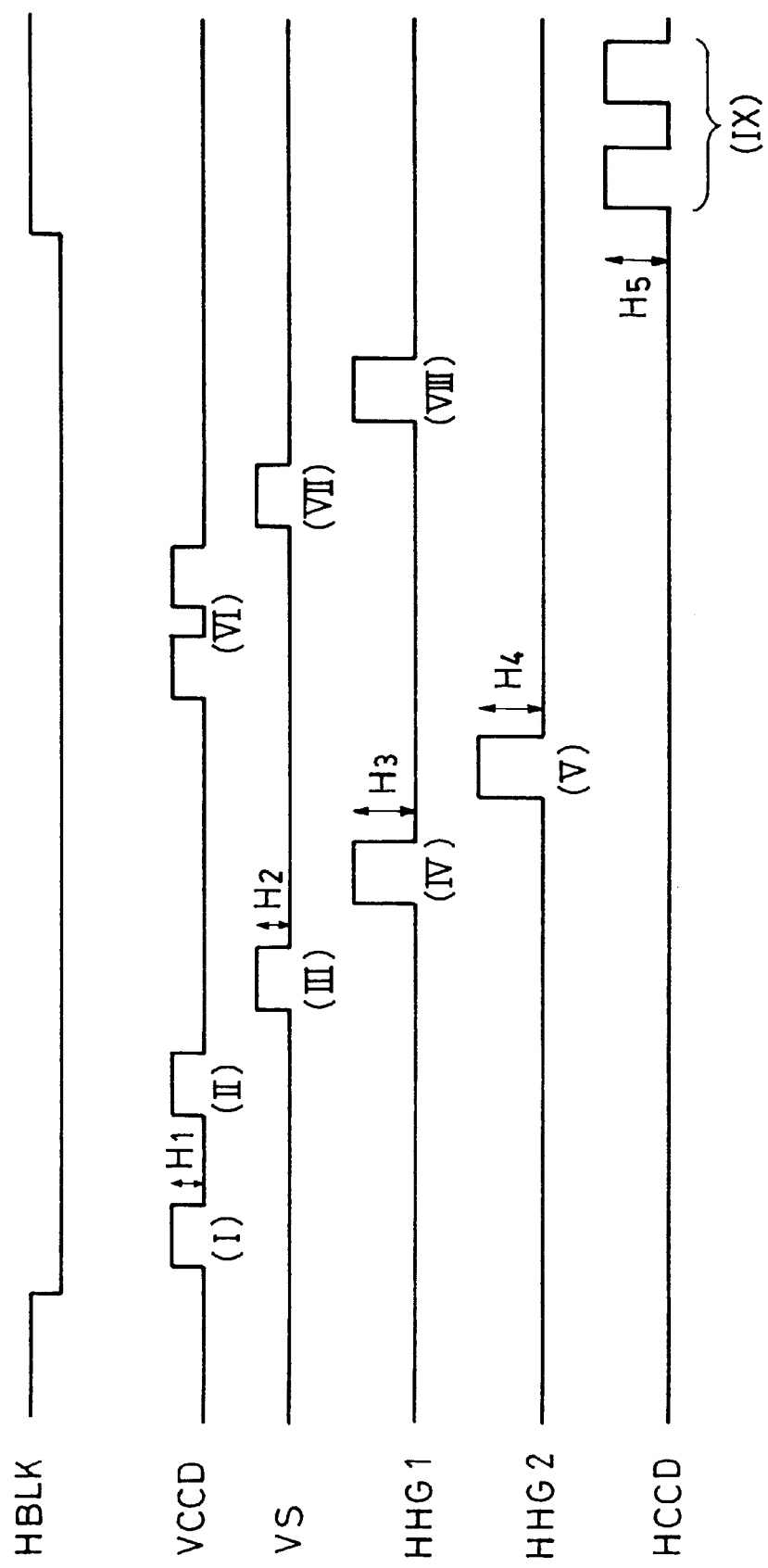
FIG. 11 is a schematic representation of the timing associated with the operation, in a high-speed movie mode, of driving the CCD shown in FIG. 9.

Referring to FIG. 11, the waveforms of pulses generated by the CCD driving circuit 20 to drive the CCD 12b in the high-speed movie mode in the digital camera of the present embodiment will be described below. FIG. 11 schematically represents the timing and amplitude of a driving voltage used in the high-speed movie mode.

In FIG. 11, when operation enters a horizontal blanking period, the vertical transfer blocks 2 are driven once by a pulse (having an amplitude $H_1$) (step I). Subsequently, the vertical transfer blocks 2 are driven once again by a pulse (having an amplitude $H_1$) so that charges associated with two lines are added together (step II). The VS 8 is then driven once by a pulse (having an amplitude $H_2=H_1$) so that the charges are transferred to the first horizontal transfer block 6a (step III). Then the gate electrode (HHG 1) is driven by a pulse (having an amplitude $H_3=2H_1$) so that the charges are transferred to the second horizontal transfer block 6b (step IV). The gate electrode (HHG 2) is then driven by a pulse (having an amplitude $H_4=2H_1$) so that the charges are transferred to the third horizontal transfer block (2-HCCD) 6c (step V).

The vertical transfer blocks 2 are then driven twice so that the charges of the pixels on the two lines immediately adjacent to the two lines whose charges have been transferred to the third horizontal transfer block (2-HCCD) 6c in the steps (I) to (V) described above are added in the channels under the VS 8 (step VI). The VS 8 is then driven once so that the charges are transferred to the first horizontal transfer block 6a (step VII). Furthermore, the gate electrode (HHG 1) is driven so that the charges are distributed into the first horizontal transfer block (1-HCCD 1) 6a and the second horizontal transfer block (1-HCCD 2) 6b. After completion of the horizontal blanking period, the horizontal transfer blocks 6a, 6b, and 6c (HCCD) are driven by a driving pulse (having an amplitude $H_5=2H_1$) so that the data associated with the first two lines is output via the output amplifier 7b and the data associated with the second two lines is output via the output amplifier 7a (step IX).

The above operation is performed repeatedly 120 times (once every horizontal blanking period) during the first (or second) half (1/120 sec) of one field period (1/60 sec). Thus, the operation of reading the charges from the 640×4×120=307200 pixels is completed and data of a frame image based on the two-pixel-addition values is obtained. The resultant data is stored in the field memory 21a.

In the first to third embodiments described above, pixel shifting may be performed for two field image data produced during a half field period (1/120 sec) or during one field period. For example, after first field image data is read in a first 1/120 sec period, second field image data is read in a subsequent 1/120 sec period and is shifted one half of pixel in the horizontal direction relative to the first field image data. These two field image data are combined to produce a single high-resolution image.

The color processing used in the first to third embodiment will be described above. FIG. 12 illustrates a color pattern of a color filter disposed on the photo-sensing surface of the CCD 12. When a still picture is taken, data is read from the CCD in a frame-reading fashion. In this case, the luminance signal Y, color signals $R_L$, $G_L$, and $B_L$, and color difference signals G−2R and G−2B are given by:

$Y=(C+Y+G+M)/4$ $$\begin{bmatrix} R_L \\ G_L \\ B_L \end{bmatrix} = MAT \begin{bmatrix} C \\ M \\ Y \\ G \end{bmatrix}$$

where MAT is a 3×4 matrix.

On the other hand, when a moving picture is taken, data is read from the CCD in a field-reading fashion in which two adjacent pixel values are added together. In this case, the luminance signal Y, color signals $R_L$, $G_L$, and $B_L$, and color difference signals G−2R and G−2B are given by:

$Y=(C+G)/2, (Y+M)/2, (C+G)/2,$ $G-2R=[(C+G)-(Y+M)],$ $G-2B=[(C+M)-(Y+G)],$

In the present invention, as described above, it is possible to read a field signal of a moving picture directly from an image-sensing device without having to use a special apparatus. Furthermore, in this invention, it is also possible to perform a high-speed moving picture. The present invention also provides expansion in the dynamic range.

What is claimed is:

1. An image pickup apparatus equipped with an interline-type image-sensing device, said image-sensing device comprising:

a plurality of photoelectric conversion elements;

a vertical transfer block for transferring the charges received from said photoelectric conversion elements along one direction, said vertical transfer block including transfer electrodes disposed in such a manner that at least three transfer electrodes are disposed for each said photoelectric conversion element;

at least one horizontal transfer block for transferring the charges received from said vertical transfer block along a direction crossing said one direction;

a mode switch adapted to switch the driving mode of said image-sensing device, said mode switch being adapted to switch the driving mode so that said image-sensing device is driven either in a still picture mode or in a moving picture mode, wherein the charges read from the photoelectric conversion elements on a plurality of lines located at adjacent positions along said one direction of said image-sensing device are successively transferred through said vertical transfer block so that the charges read from the photoelectric conversion elements on the plurality of lines located at adjacent positions along said one direction of said image-sensing device are added together in said horizontal transfer block thereby outputting the added pixel signal, wherein in said still picture mode one frame data is output during one field period, said frame data being produced on the basis of the charges read from said photoelectric conversion elements in which no addition is performed between the charges read from two photoelectric conversion elements located at adjacent positions along said one direction, while in said moving picture mode, field data is output, said field data being produced on the basis of the charges read from said photoelectric conversion elements in which the charges read from two photoelectric conversion elements located at adjacent position along said one direction are added together and wherein a driving pulse for driving said horizontal transfer block has an amplitude corresponding to the number of photoelectric conversion elements whose charges are added together after being read.

2. An image pickup apparatus equipped with an interline-type image-sensing device, said image-sensing device comprising:

a plurality of photoelectric conversion elements;

a vertical transfer block for transferring the charges received from said photoelectric conversion elements along one direction, said vertical transfer block including transfer electrodes disposed in such a manner that at least three transfer electrodes are disposed for each said photoelectric conversion element;

at least one horizontal transfer block for transferring the charges received from said vertical transfer block along a direction crossing said one direction;

a mode switch adapted to switch the driving mode of said image-sensing device, said mode switch being adapted to switch the driving mode so that said image-sensing device is driven either in a still picture mode or in a moving picture mode, wherein the charges read from the photoelectric conversion elements on a plurality of lines located at adjacent positions along said one direction of said image-sensing device are successively transferred through said vertical transfer block so that the charges read from the photoelectric conversion elements on the plurality of lines located at adjacent positions along said one direction of said image-sensing device are added together in said horizontal transfer block thereby outputting the added pixel signal, wherein in said still picture mode one frame data is output during one field period, said frame data being produced on the basis of the charges read from said photoelectric conversion elements in which no addition is performed between the charges read from two photoelectric conversion elements located at adjacent positions along said one direction, while in said moving picture mode, field data is output, said field data being produced on the basis of the charges read from said photoelectric conversion elements in which the charges read from two photoelectric conversion elements located at adjacent position along said one direction are added together and wherein said moving picture mode has both:

a normal moving picture mode in which the addition operation of adding the charges read from two photoelectric conversion elements located at adjacent positions along said one direction is performed once during each horizontal blanking period thereby outputting one field data during one field period; and a high-speed moving picture mode in which the addition operation of adding the charges read from two photoelectric conversion elements located at adjacent positions along said one direction is performed twice during each horizontal blanking period thereby outputting one field data during a half field period.

3. An image pickup apparatus comprising:

an image-sensing part, said image-sensing part including:

a plurality of photoelectric conversion elements;

a plurality of vertical transfer blocks, each vertical transfer block adapted to transfer signals received from said plurality of photoelectric conversion elements located along a vertical direction; and at least one horizontal transfer block adapted to transfer signals received from said plurality of vertical transfer blocks along a direction crossing the vertical direction, and a mode switch adapted to switch a driving mode to drive said image-sensing region in a still picture mode, a first moving picture mode, or in a second moving picture mode, wherein, in the still picture mode, the signals on two lines in the vertical direction are transferred to said at least one horizontal transfer block during one horizontal blanking period without addition, and outputted from said at least one horizontal transfer block without addition while, in the first moving picture mode, the signals read out from the first two lines in the vertical direction are added together in the at least one horizontal transfer block during one horizontal blanking period, and in the second moving picture mode, the signals read out from the first two lines in the vertical direction are added together, thereafter the signals read out from the second two lines in the vertical direction are different from the first two lines added together, in the at least one horizontal transfer block during one horizontal blanking period.

4. An image pickup apparatus according to any of claims 1, 2 or 3, wherein in said moving picture mode, the addition of the charge between two photoelectric conversion elements is performed such that a resultant sum of the charge of the two photoelectric conversion elements is interlaced between odd-numbered fields and even-numbered fields.

5. An image pickup apparatus according to claim 4, wherein there are a plurality of horizontal transfer blocks which are constructed so that charges may also be transferred among these horizontal transfer blocks, and the driving pulse for driving said plurality of horizontal transfer blocks and the driving pulse for controlling the transfer operation among these horizontal transfer blocks each have an amplitude corresponding to the number of photoelectric conversion elements whose charges are added together after being read.

6. An image pickup apparatus according to claim 5, wherein, of said plurality of horizontal transfer blocks, a horizontal transfer block located at a position furthest from said vertical transfer block structured to add charges, and said horizontal transfer block at the furthest position has a transfer capacity greater than other horizontal transfer blocks.

7. An image pickup apparatus according to claim 5, wherein the charges read from two photoelectric conversion elements located at adjacent positions along said one direction are added together in a final stage of said vertical transfer block.

8. An image pickup apparatus according to claim 7, wherein, in said moving picture mode, one field data is produced by a synthesizer from two successive field data based on different amounts of exposure of light incident on said photoelectric conversion elements.

9. An image pickup apparatus according to claim 8, wherein, in the synthesis, when an exposure of the field data from among the two successive field data, having a greater amount of exposure than the other field data from among the two successive field data is within the range in which no saturation occurs, this field data is employed as the output field data while when the exposure of the field data having a greater amount of exposure than the other field data is within the range in which saturation occurs, the field data having a smaller amount of exposure is multiplied by a predetermined factor and the resulting multiplied data is employed as the output field data.

10. An image pickup apparatus according to claim 9, wherein, the amount of exposure to said photoelectric conversion elements is controlled by controlling the exposure time by an electric shutter in which the charges accumulated in said photoelectric conversion elements are swept out toward a substrate.

11. An image pickup apparatus according to any of claims 1, 2 or 3, wherein, in said moving picture mode, one output field data is produced by combining two successive field data which are shifted from each other.

\* \* \* \* \*